United States Patent [19]

Ogasawara

[11] Patent Number: 4,826,305
[45] Date of Patent: May 2, 1989

[54] OUTER MIRROR FOR MOTOR VEHICLE

[75] Inventor: Morihiko Ogasawara, Aichi, Japan

[73] Assignee: Kabushiki Kaisha Tokai Rika Denki Seisakusho, Aichi, Japan

[21] Appl. No.: 124,965

[22] Filed: Nov. 24, 1987

[30] Foreign Application Priority Data

Nov. 25, 1986 [JP] Japan .................................. 61-280969

[51] Int. Cl.$^4$ ................................................ G02B 7/18
[52] U.S. Cl. .................................... 350/631; 248/479;
248/480; 350/632
[58] Field of Search .............. 350/631, 632, 634, 636,
350/637; 248/476, 477, 478, 479, 480, 485, 486,
487

[56] References Cited

U.S. PATENT DOCUMENTS

| 3,972,597 | 8/1976 | Repay et al. .................. 350/634 |
| 4,277,140 | 7/1981 | Manzoni ........................ 350/632 |
| 4,502,759 | 3/1985 | Herzog et al. ................. 350/636 |
| 4,705,368 | 11/1987 | Manzoni ....................... 350/632 |

FOREIGN PATENT DOCUMENTS 60-37857 11/1985 Japan .

Primary Examiner—John K. Corbin
Assistant Examiner—Martin Lerner
Attorney, Agent, or Firm—Birch, Stewart, Kolasch & Birch

[57] ABSTRACT

An outer mirror for use in a motor vehicle is designed to prevent or attenuate chattering vibrations which a mirror holder holding a mirror produces against a mirror visor. This outer mirror assembly is provided with a first vibration-preventive member which is used in the mirror holder and with a second vibration-preventive member which is housed in a mirror visor and held in slidable contact with the first vibration-preventive member. The slidable surface of the first vibration-preventive member forms a curve which satisfies a condition that the inclination $\alpha'$ of the tangential line at each contact point of the two vibration-preventive members is always larger than the angle of friction $\lambda$ between the two vibration-preventive members. According to this structure, the first vibration-preventive member or the mirror holder is always given an outwardly acting force by the second vibration-preventive member which is provided with a spring. The force acting only in one direction assuredly prevents a mirror holder from producing chattering vibrations.

3 Claims, 3 Drawing Sheets

1

OUTER MIRROR FOR MOTOR VEHICLE

BACKGROUND OF THE INVENTION

1. Field of the Invention

The present invention generally relates to an outer mirror assembly, such as a door mirror assembly and a fender mirror assembly, for a motor vehicle and, more particularly, to an outer mirror assembly wherein the vibration of the mirror holder that occurs against the mirror visor during driving is prevented or attenuated.

2. Prior Art

For the prevention of such a vibration there have been proposed various means, one of which, officially disclosed under Japanese first Utility Model Publication No. 37857/1985, comprises a first vibration-preventive member provided to a mirror holder and a second vibration-preventive member in a mirror visor, each member placed in slidable contact with each other, as shown in FIG. 6.

In said means illustrated in FIG. 6, a mirror 1 is provided, as well as a mirror holder 2 which holds the back of the mirror 1, and a mirror-positioning unit 4 which tilts the mirror upwardly and downwardly as well as laterally. This mirror-positioning unit 4 is fixedly housed in a space interiorly defined by the mirror visor which is not shown in the drawings.

The mirror holder 2 has a coupling means 2a at its center and a case 4b of the mirror-positioning unit 4 also has a coupling means 4a. The coupling means 2a fitted with the coupling means 4a in such a manner as to be movable in a upwardly and downwardly and laterally tilting movement.

The mirror-positioning unit 4 has at least one mirror-driving rod 5, one end of which is relatively movably connected to the mirror holder 2. This rod 5 is generally threaded. A motor and a motive power transmission mechanism therefor are provided in the case 4b of the mirror-positioning unit. The motive power transmission mechanism includes a nut member (not shown) which is fitted over the rod 5. By rotation of this nut, the rod 5 is moved in axial directions in such a manner as to move said mirror holder 2 and to change the attitude of the mirror 1.

Both the mirror holder 2 and case 4b have at least two vibration-preventive members 3 or 4d. The two vibration-preventive members 3 and 4d face each other and come into contact with each other at their respective slidable contact surfaces 3a and 4c. Therefore, if a vibration occurs in a motor vehicle during driving, the occurrence of the relative chattering vibration which the mirror 1 (the mirror visor) produces against the case 4b is, the mirror visor, is effectively prevented.

In these vibration-preventive members 3 and 4d, each of the respective slidable contact surfaces 3a and 4c forms an arc having as the center a point O around which the mirror holder 2 is moved for changing the attitude of the mirror 1.

However, problems are involved in the practices where arcs are formed as stated above. Once a chattering vibration starts, caused by, for example, resonance in the mirror holder assembly, friction loses its effect. Therefore, chattering vibrations cannot be effectively prevented.

SUMMARY OF THE INVENTION

Accordingly, an essential object of the present invention is to structurally improve the vibration-preventive member on the mirror holder and on the mirror visor, with respect to each facing pair, so as to effectively prevent chattering vibrations of the mirror and the mirror holder.

In accomplishing this and other objects, an embodiment is provided according to the present invention wherein:

a second vibration-preventive member formed on the side of the mirror visor, relative to a first vibration-preventive member formed on the side of the mirror holder, is positioned at an outer side in the direction of a radius extending form a point on which the mirror holder is pivotally moved;

said first vibration-prevention member has a slidable surface which faces said second vibration-preventive member, whereas said second vibration-prevention member is formed of a spring as material and has a contacting member which is pressed against said slidable surface of said first vibration-preventive member; and said slidable surface of said first vibration-preventive member is required to be a curved surface which satisfies the condition that, given $\alpha'$ as the inclination of a tangential line at each contact point of both vibration-preventive members and given $\lambda$ as the angle of friction between said two vibration-preventive members, $\alpha' > \lambda$ must be satisfied by whatever position the mirror holder takes with respect to its attitude.

Since, in this structure and the relative positions, the inclination $\alpha'$ of the tangential line at each contact point of both vibration-preventive members is always larger than the angle of friction $\lambda$ between said two vibration-preventive members, the contacting member of said second vibration-preventive member is always under pressure to fall along the slidable surface of said first vibration-preventive member. In other words, said first-vibration preventive member, that is, the mirror holder, is always under pressure to act outwardly by the pressure of said second vibration-preventive member acting as a spring. By virtue of pressure only in one direction as stated above, a mirror holder is assuredly prevented from chattering vibration.

In the structure as stated above, it is preferable for the slidable curved surface of said first vibration-preventive member to be a curved surface consisting of a logarithmic spiral or a curve similar to it in cross section taken in the sliding direction. Since, in this structure, the inclination of the tangential line at each contacting point between the two vibration-prevention members is always maintained constant irrespective of the position of the mirror holder, the resistance to the pivotal movement becomes a constant value, and consequently, it becomes possible to pivotally smoothly move the mirror holder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This and other objects and features of the present invention will become apparent from the following description taken in conjunction with the preferred embodiment thereof with reference to the accompanying drawings which are given by way of illustration only, and thus, are not limitative of the present invention, and in which.

DETAILED DESCRIPTION OF THE INVENTION

Figure 1:
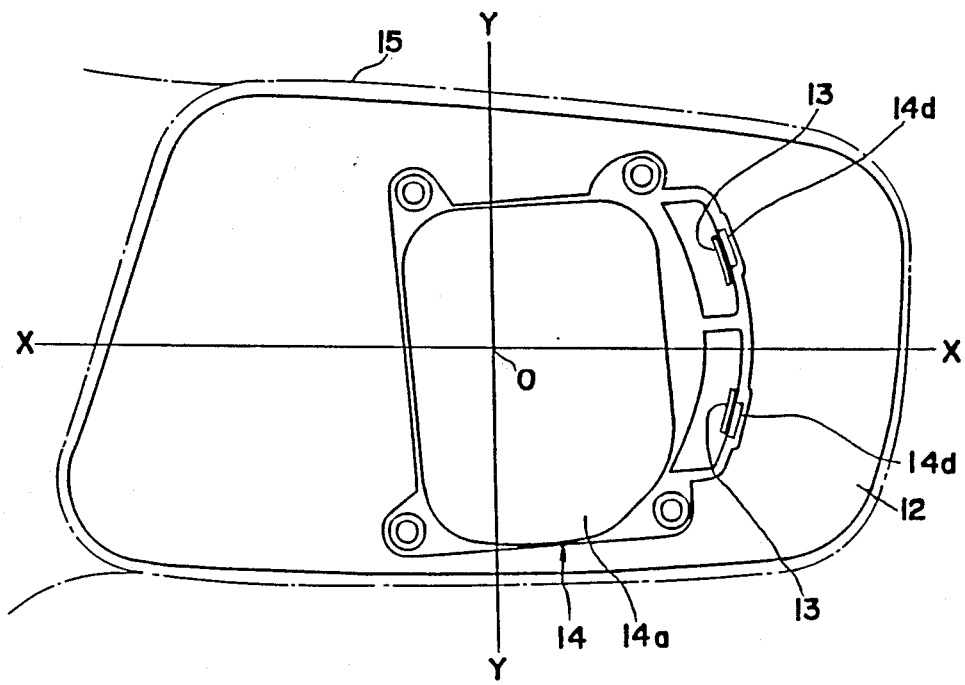
FIG. 1 shows an inside of the mirror visor of a door mirror assembly according to a preferred embodiment of the present invention, as seen from the front of the car.

Before the description of the present invention proceeds, it is to be noted that like parts are designated by like reference numerals and symbols throughout the several views of the accompanying drawings.

Referring now to FIGS. 1 through 5, a preferred embodiment of the present invention will now be described.

Figure 6:
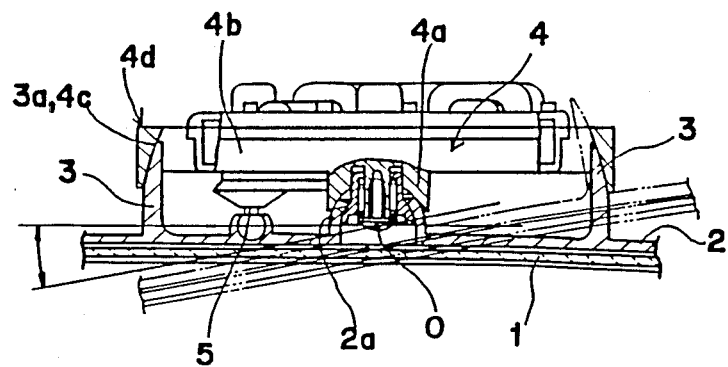
FIG. 6 is a cross-sectional view of an outer mirror assembly according to a prior art arrangement, as previously described.

In this embodiment, in a manner similar to a conventional example as shown in FIG. 6, a mirror-positioning unit 14 is fixed in position in a space interiorly defined by a mirror case 15.

In FIG. 1, a mirror-positioning unit 14 housed in a space interiorly defined by a mirror visor 15, and a mirror holder 12 to hold a mirror are shown as seen from the front of a motor vehicle toward the back thereof. In this embodiment, in a manner similar to a conventional example as shown in FIG. 6, the mirror-positioning unit 14 is fixed in position with the mirror visor 15, and a coupling means provided for the case 14a of the mirror-positioning unit is connected with coupling means provided to the mirror holder 12 in such a manner as to be pivotally movable. More specifically, the mirror holder 12, is movable relative to the mirror-positioning unit 14 and to the mirror visor 15 along the Y-Y axis and along the X-X axis.

A pair of claw type vibration-preventive members 13 (first vibration-preventive members) are provided for the mirror holder 12 at predetermined positions on the back thereof. The pair of first vibration-preventive members 13 are provided at positions a little to the right of the center O of the pivotal movement of the mirror holder and substantially in symmetry on both sides of the X-X axis.

The case 14a of the mirror-positioning unit 14 has a peculiar shape. A pair of protruded vibration preventive members 14d (second vibration-preventive members) are provided on the case 14a in correspondence to the pair of first vibration-preventive members 13, referred to above.

Figure 2:
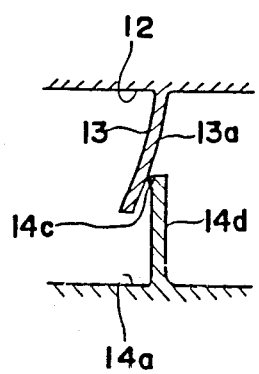
FIG. 2 illustrates a first vibration-preventive member and a second vibration-preventive member in an enlarged cross-sectional view.

In FIG. 2, contact between a first vibration-preventive member 13 and a second vibration-prevention member 14d is shown whereby the two jointly perform their functions. As shown in FIGS. 1 and 2, each of the second vibration-preventive members 14d is positioned relative to a first vibration-preventive member 13 at an outer side in the direction of a radius extending from a point O on which the mirror is pivotally moved. The contacting point 14c formed at the tip of a second vibration-preventive member 14d is pressed against the sliding surface 13a of a first vibration-preventive member 13. The second vibration-preventive member 14d is formed of a spring material and pliably movable on the base as a fulcrum. The spring of said second vibration-preventive member 14d has its force substantially toward the center of the pivotal movement of the mirror.

The slidable contact surface 13a of the first vibration-preventive member 13, in a cross-sectional view taken in the sliding directions, has a logarithmic spiral which has the center O on which the mirror holder is pivotally moved. The slidable contact surface may also be a curve which closely resembles said logarithmic spiral.

Figure 3:
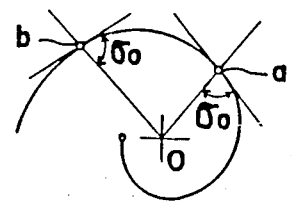
FIG. 3 illustrates a logarithmic spiral.

As shown in FIG. 3, a logarithmic spiral is a curve wherein, as is known, angles formed by the tangential lines at arbitrary points a and b and the straight lines connecting said points "a" and "b" with the center O, expressed as $\sigma_0$, are constant.

Figure 5:
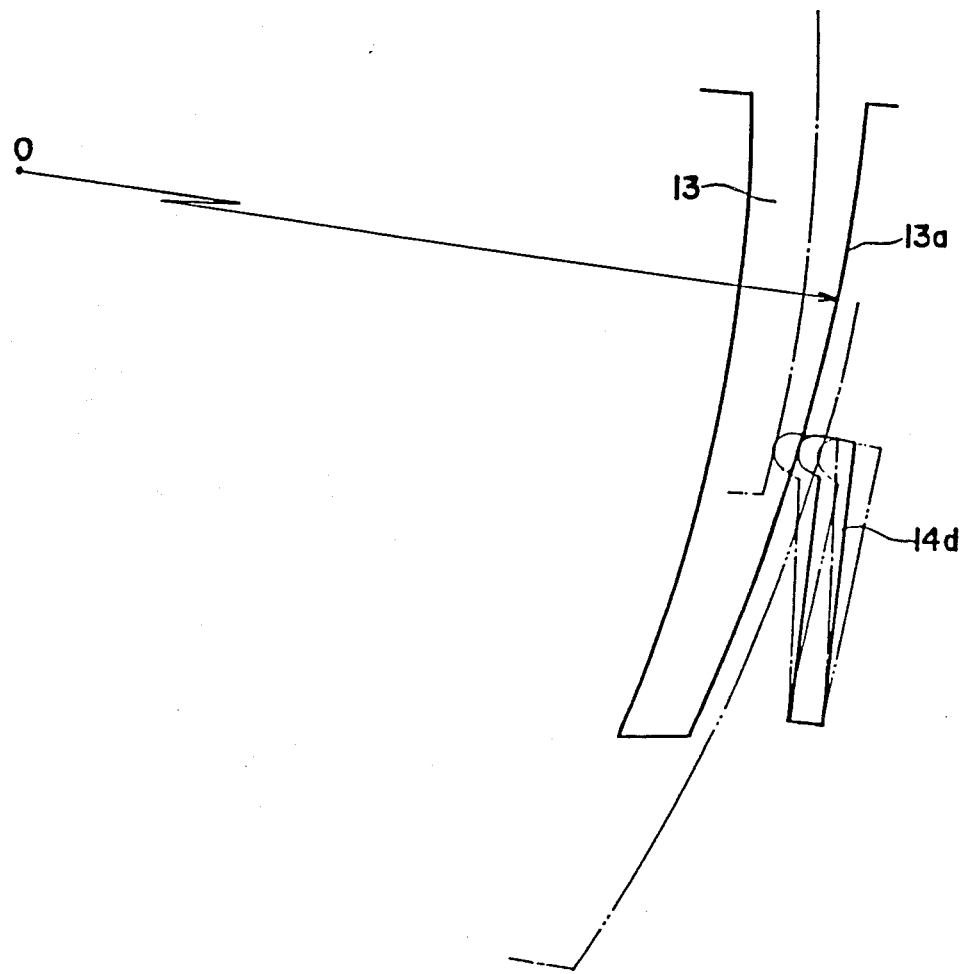
FIG. 5 illustrates the contacts between the first and second vibration-preventive member with respect to various positions to which a mirror holder is pivotally moved.

When the slidable surface 13a of a first vibration-preventive member 13 thus assumes a logarithmic spiral or a curve closely resembling it, whatever position the mirror holder is pivotally moved to on the Y-Y axis, as shown in FIG. 5, the tangential line at a contact point of the two vibration-preventive members forms substantially a constant angle with the straight line connecting the contact point with the center O. Whatever position a mirror holder, or the first vibration-preventive member 13, may take on the solid line, or on the one dot-chain line, or on the two dot-chain line, the condition of contact of the two vibration-preventive members is substantially constant, the second vibration-preventive member 14d receiving a constant force from the first vibration-preventive member 13. The mirror holder can thus be pivotally moved under stabilized resistance and, can therefore be smoothly moved. Since, as shown in FIG. 5, the position of the tip of the second vibration-preventive member changes depending on the position of the first vibration-preventive member, there may occur a change in the force which the second vibration-preventive member 14d applies to the first vibration-preventive member 13, but the change occurs in only a negligible degree.

The logarithmic spiral is preferred to be such that the undermentioned condition can be satisfied.

Figure 4:
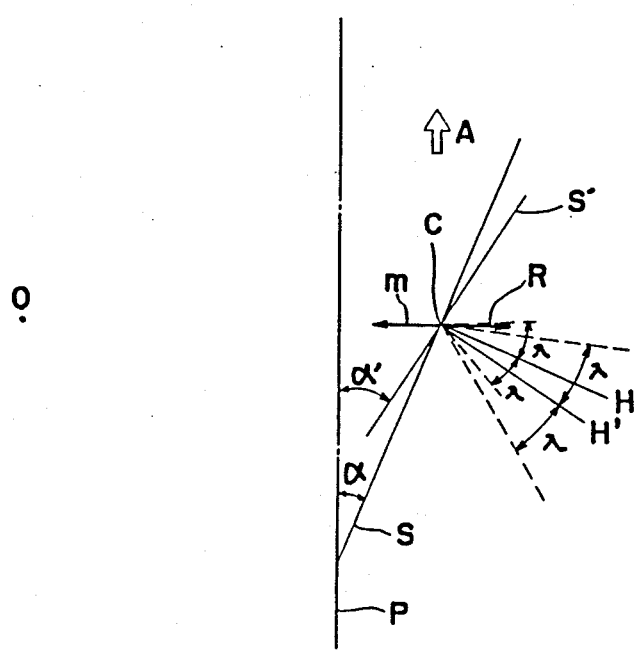
FIG. 4 illustrates the inclination of a tangential line at the slidable surface of the first vibration-preventive member.

In FIG. 4, the center on which a mirror holder is pivotably moved is denoted as O, the pressure which the second vibration-preventive member has upon a first vibration-preventive member is shown as m, and the resistance which the first vibration-preventive member has upon the second vibration-preventive member is shown as R. Whereas a line P is drawn at a right angle to the pressure m and the resistance R, the tangential line at the contact point between the two vibration-preventive members is given by S, the inclination formed by said tangential line S against the line P is given by $\alpha$, the normal against the tangential line S is given by H, and the angle of friction is given by $\lambda t$. The relation between the two vibration-preventive members is then studied as a problem of sliding friction.

If the second vibration-preventive member is stationary against the first vibration-preventive member at the tangential line S, $\alpha < \lambda$ results.

If the second vibration-preventive member exhibits sliding against the first vibration-preventive member, $\alpha > \lambda$ must be satisfied. In this embodiment, the inclination formed by the tangent line S' is set at an angle $\alpha'$ which is sufficiently larger than $\alpha$. In other words, $\alpha' > \lambda$ is given (H' is a normal for the line S'). When an inclination is set as above, the second vibration-preventive member is always under pressure to slide against the first vibration-preventive member. In other words, the first vibration-preventive member, or the mirror holder, is always pressurized by the second vibration-preventive member to move in the direction of the arrow A with O as the center of the pivotal movement. Therefore, even if there is a little looseness between the outer thread of the mirror-driving rod and the inner thread of the nut which drives it, the looseness is absorbed by a pushing pressure exerted by a turn of the mirror holder. In the state as described above, it is not mere frictional force that puts one vibration-preventive member in firm contact with the other, but they are in tight contact by the pressure of the second vibration-preventive member acting on the first vibration-preventive member. A chattering vibration that occurs during driving of a motor vehicle can, therefore, be effectively prevented.

Although the present invention has been fully described by way of example with reference to the accompanying drawings, it is to be noted, here, that various changes and modifications will be apparent to those skilled in the art. Therefore, unless such changes and modifications depart from the scope of the present invention, they should be construed as included therein.

What is claimed is:

1. A mirror assembly comprising:
   a mirror holder for holding a mirror;
   support means for holding said mirror holder, the mirror holder being pivotally attached to the support means in a mirror visor and having a pivotal center;
   mirror positioning means for pivotally moving said mirror holder in the mirror visor;
   a first vibration-preventive member on said mirror holder, said first vibration-preventive member having a sliding surface; and
   a second vibration-preventive member in the mirror visor, said sliding surface of said first vibration-preventive member being placed in slidable contact with said second vibration-preventive member, said second vibration-preventive member being positioned outside of said first vibration-preventive member relative to a radius extending from the center on which said mirror holder is pivotally mounted, said second vibration-preventive member acting as a spring member and having a contact point which passes against the sliding surface of said first vibration-preventive member,
   said sliding surface of said first vibration-preventive member comprising a curve with an angle $\alpha'$ of inclination of a tangential line at each contact point between the first and second vibration-preventive members and with an angle $\lambda$ of friction between the first and second vibration-preventive members whereby the sliding surface is arranged for $\alpha' > \lambda$ for holding the mirror holder in a position to which the mirror holder is pivotally moved.

2. The mirror assembly as claimed in claim 1, wherein the sliding surface of said first vibration-preventive member has a cross section in the sliding direction forming one of a logarithmic spiral and a curve which approximates a logarithmic spiral, the logarithmic spiral having a center corresponding to the pivotal center of said mirror holder.

3. The mirror assembly as claimed in claim 1, wherein said assembly is an outer mirror assembly for use in a motor vehicle.

* * * * *